Sept. 4, 1928.
J. HERR
SEED HARVESTER
Filed June 24, 1925
1,683,183
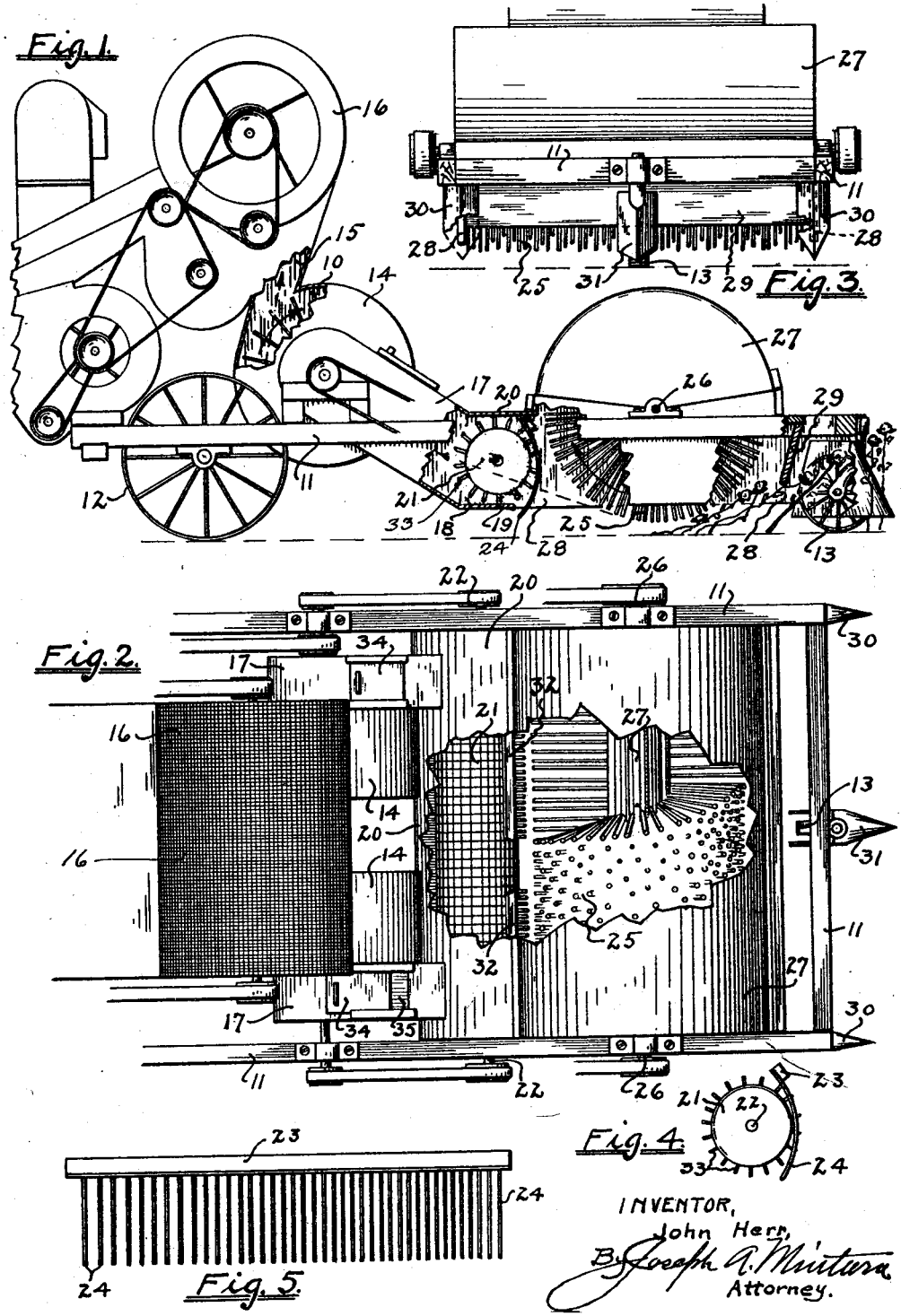
INVENTOR,
John Herr,
By Joseph A. Minturn
Attorney.

Patented Sept. 4, 1928.

1,683,183

UNITED STATES PATENT OFFICE.

JOHN HERR, OF NEAR LEBANON, INDIANA.

SEED HARVESTER.

Application filed June 24, 1925. Serial No. 39,368.

My invention herein described relates to means for gathering seed directly from standing or mown grasses and grains in the fields, and it is the chief object of this invention to provide means whereby all suitable ripened seed may be gathered by operating the device over the field of seed bearing grasses or grains, such that the minimum of straw, stalks, and the like are picked up, this material being rejected, thereby permitting a simplified and portable separating means to work in conjunction with the gathering means.

Further objects reside in the simplified structure and its consequent low cost of operation, its adaptability to a wide range of field conditions, low power consumption, and in the elimination of the heretofore necessary slow and tedious steps of cutting and curing the seed bearing material.

I take clover seed harvesting as an example, although my invention is adapted, by minor changes, such as elevating the seed gathering brush, to gather the larger grains, as wheat. It has been the usual procedure in harvesting clover seed to await the time when an average of the field showed the clover seed to be approaching the ripened stage; then go in and mow it down, gathering it in bunches; then permit the cut clover to ripen in the bunches; and finally, and only at limited periods such as late in the morning after the dew has dried off, to gather up the thoroughly dried clover onto wagons, with the attendant shattering of the seed through the necessary handling and so haul the clover to a stationary power-operated clover separating machine, wherein the seed was separated and passed into bags and the straw run out onto a stack. Weather conditions had to be exactly right to allow the clover to be neither too damp nor too dry, else there would be a large loss of seed, and as whether conditions can not be controlled, it was only by chance that perfectly favorable conditions were obtained.

My harvester eliminates all such difficulties by being so constructed as to operate over the entire field to gather the ripened seed directly from the standing stems or even from the fallen stems, separating the seed continuously as gathered, thereby eliminating the long-drawn out and tedious operations above described in the old method.

My invention as herein described relates to the gathering means proper of my harvester, the chief objects of which are above set out, and having such other objects as will be apparent in the following description as illustrated by the accompanying drawing, in which Fig. 1 is a vertical right-hand side elevation of my seed harvester, with fragments of the walls removed to show the pertinent features of the invention; Fig. 2, a top plan view of the forward part of the seed harvester, likewise having fragments of the walls broken away to disclose the interior parts; Fig. 3, a front elevation of the lower portion of the seed harvester; Fig. 4, an end view of the screen roller and straw guard showing teeth added to the roller; and Fig. 5 a front elevation of the straw guard.

Like characters of reference designate like parts throughout the several views of the drawing.

I mount the fans 10, here shown as two in number, upon a suitable frame 11, in turn carried by the two rear wheels 12 and the front pivoted caster wheel 13. The number of fans 10 may be varied to suit the machine size and the seeds to be gathered. The fans 10 are entirely enclosed within the housings 14 and have discharged conduits 15 carrying the blast from the fans into a blast release cylinder 16.

The fan intake conduits 17 extend downwardly and forwardly and terminate in a horizontal transverse compartment 18 having the lower floor 19 and being further enclosed by a back and top wall 20, such that the forward side of the compartment is left open. Within the compartment 18, so as to have its forward side projecting beyond the front edge of the floor 19, I mount the screen roller 21 such that it may be revolved about its trunnions 22. The screen roller is hollow and has its circumferential surface covered by a comparatively wide-spaced wire screen. Immediately forward of the screen roller 21 and in close proximity to it, I detachably place the straw guard 32, a front elevation of which is shown in Fig. 5, formed by the transverse bar 23 with a plurality of depending and backwardly curving teeth or fingers 24. These fingers 24 are of length sufficient to extend downwardly to terminate below the floor 19.

A gathering brush 25 is transversely carried on the frame 11, ahead of the screen roller 21, by the trunnions 26 so as to permit its being revolved. The brush 25 is preferably formed with heavy steel spring wires projecting outwardly from their inner ends locked in the central axial spool 27 and these wires may be quite widely spaced apart. The brush 25 extends downwardly to within several inches of the ground, though this distance may be varied to meet the different conditions encountered. The upper side of the brush is completely enclosed by the housing 27 and the sides 28 are extended forwardly from the sides of the compartment 18 to enclose the lower ends of the brush 25, as best shown in Fig. 1. The forward lower part of the brush 25 is further partly enclosed by the leveling board 29, preferably, though not necessarily, inclined backwardly toward the brush.

Guards 30 are placed over the ends of the sides 28 to aid in dividing, and directing the seed bearing material so as to leave a sharp line of division between the gathered and ungathered seed. A guard 31 is also placed about the caster wheel 13 to prevent damage to the seed by the wheel.

In operating the seed harvester, it is preferably attached to the side of a tractor and carried along with the caster wheel 13 leading, and the necessary power for operating the gathering mechanism is transmitted by shaft or belt from the tractor. I have also successfully used the harvester by pulling it with horses.

Referring to Fig. 1 of the drawing, the harvester in traveling over the field defines a width of standing clover (or other grasses or grains) between the guards 30 which is further parted into two widths by the center guard 31. As the harvester proceeds forwardly, such clover is contacted by the depending leveling board 29 which compresses the clover forwardly and downwardly toward the ground, and with the continued travel of the harvester, the compressed clover is released behind the board 29 such that it tends to spring back to its original upright position, but before such position is attained, the harvester has traveled ahead to cause the brush 25 to contact the clover heads as they spring upwardly.

The brush 25 is revolved clock-wise, in the direction indicated by the solid-line arrow, and consequently strikes the rising clover heads and strips them and beats the loosened seed bearing material back under the brush tending to throw it tangentially backwardly and upwardly behind the brush and in the direction of the forward opening of the compartment 18.

The fans 10 are rapidly revolved in the direction as indicated by the solid-line arrow and a suction is created in the intake conduits 17 such that a strong current of air is drawn from in front of, around, and under the brush 25 through the screen roller 21, through the compartment 18, the conduits 17, and into the fans 10, to be discharged and released in the blast release cylinder 16 above.

The seed bearing material loosened, picked up and kicked back by the brush 25 is borne along on this current of air and passes through the screen roller 21, into the compartment 18 and thence through the intake conduits 17, the fans 10, and on to the blast release cylinder 16, all in the general direction as indicated by the dash-line arrows.

It is only the actual seed that is desired to be harvested, and all possible straw is stopped before it enters the separating means of the harvester. The screen roller 21 and the accompanying straw guard 32 are provided to effect this result. Such means are particularly effective where there is much fallen stalks of clover or the like, or a heavy crop of weeds, or where the clover or grass has previously been cut down in swaths.

The screen roller 21 revolves in the direction indicated by the solid-line arrow, Fig. 1 in the same direction as that of the brush 25 and at a speed comparatively slower than that of the brush 25. What straw is picked up and kicked back, strikes on the straw guard 32 and would normally be held there by the suction, but as the screen roller revolves, it contacts the straws projecting through the fingers of the guard 32 and so wipes or carries the straw downwardly to permit it to slide off and drop to the ground below, away from the action of the suction. The strong suction carries the finer seed bearing particles away from the straw as it slides downwardly, and through the roller as above described. Where the amount of straw and trash encountered is excessive, teeth 33, Fig. 4, are added to the roller 21 to project radially so as to actually extend between the fingers 24 of the straw guard 32 and positively carry the straw down off the guard.

The leveling board 29 not only serves to compress the clover downwardly but serves to level the heads by bringing them down to a straight horizontal line so that all heads along that line may later be struck by the brush 25 simultaneously. The board 29 also serves to enclose the space ahead of the compartment 18 so that the suction is effective at the time and at the line where the heads are struck by the brush with the result that the loosened particles are not allowed to drop to the ground but are carried back on the inrushing current of air.

Under certain conditions, the suction of the fans may be too strong, and to reduce the suction, I provide the sliding doors 34 as closures over the vents 35 in the fan intake conduits 17. By adjusting the opening of these doors 34, the suction through the screen roller 21 and consequently through and about the brush 25 may be varied as desired.

Attention is called to the fact that, while I have above described the operation of my harvester device as that particularly applying to the harvesting of the seed from standing stalks or stems, wherein the brush 25 is revolving clockwise, and that such a direction of rotation of the brush 25 may be also employed where the seed bearing material has previously been cut down in swaths, I distinctly point out that, where the swath is heavy and contains much straw, the brush is turned anti-clockwise in the reverse direction from that as indicated by the solid-line arrow in Fig. 1, such that the seed bearing material is picked up off of the ground and carried up over the forward side of the brush 25, around over the top of the brush and thence downwardly across in the front of the screen roller or drum 21, where the ingoing blast of air picks up and carries in the seed away from the straw as above described.

Having described my invention in its present form as now best known to me, I do not desire to be limited to the precise structure as shown, nor any more than may be required by the following claims, as it is obvious that many structural changes may be made without departing from the spirit of the invention.

I claim:

1. A seed harvester comprising revolving means for stripping seed bearing material in the field, a revolving drum having a perforated surface, and suction means creating an inrush of air to draw the seed bearing material through said drum, and a straw guard in front of said drum.

2. A seed harvester comprising revolving means for stripping seed bearing material in the field, a revolving drum having a perforated surface, and suction means creating an inrush of air to draw the seed bearing material through said drum, and a straw guard in front of said drum, and fingers projecting from the drum to clean said straw guard.

3. In a seed harvester, a compartment discharging into suction producing means and open along one side; a drum revolving across said opening; a picker brush housing discharging into said compartment, said housing being open at the bottom; and a picker brush revolving within said housing.

4. In a seed harvester, a compartment discharging into suction producing means and open along one side; a drum revolving across said opening; a picker brush housing discharging into said compartment, said housing being open at the bottom; and a picker brush revolving within said housing, and a guard across the opening of said compartment between said drum and said picker brush.

5. In a seed harvester, suction producing means; a compartment discharging into said suction means; a floor defining the under side of the compartment, and being the lower edge of an opening along the forward side of the compartment; and a stripper brush revolving forwardly of said compartment, and a straw guard across the opening of said compartment.

6. In a seed harvester, suction producing means; a compartment discharging into said suction means; a floor defining the under side of the compartment, and being the lower edge of an opening along the forward side of the compartment; and a stripper brush revolving forwardly of said compartment, and a straw guard across the opening of said compartment, and means of cleaning said guard to deposit the straw on the ground.

7. In a seed harvester, a suction compartment, a straw-rejecting drum revolving downwardly across the intake opening of the compartment, guard fingers across the opening of the compartment, and teeth projecting from the drum between said fingers.

8. In a seed harvester, a stripping brush, a seed receiving compartment, means between said brush and said compartment for rejecting straw, and fan means for creating a blast of air from said brush through said straw rejecting means and into said seed receiving compartment.

9. In a seed harvester, a stripping broom, a seed receiving compartment, means between said broom and said compartment for rejecting straw, and means for drawing a blast of air from said broom through said straw rejecting means and into said seed receiving compartment.

In testimony whereof I affix my signature.

JOHN HERR.